(12) United States Patent
Johs et al.

(10) Patent No.: US 7,705,995 B1
(45) Date of Patent: Apr. 27, 2010

(54) METHOD OF DETERMINING SUBSTRATE ETCH DEPTH

(75) Inventors: Blaine D. Johs, Lincoln, NE (US); Jeffrey S. Hale, Lincoln, NE (US)

(73) Assignee: J.A. Woollam Co., Inc., Lincoln, NE (US)

( * ) Notice: Subject to any disclaimer, the term of this patent is extended or adjusted under 35 U.S.C. 154(b) by 681 days.

(21) Appl. No.: 11/153,052

(22) Filed: Jun. 15, 2005

Related U.S. Application Data (60) Provisional application No. 60/637,388, filed on Dec. 20, 2004.

(51) Int. Cl.
*G01B 11/02* (2006.01)

(52) U.S. Cl. .................................................. 356/504

(58) Field of Classification Search ............. 356/369, 356/450, 497, 498, 503, 504
See application file for complete search history.

(56) References Cited

U.S. PATENT DOCUMENTS

| | | | |
|---|---|---|---|
| 3,274,882 A | 9/1966 | Krieger et al. | 356/369 |
| 3,807,868 A | 4/1974 | Simila | 356/118 |
| 4,523,848 A | 6/1985 | Gorman et al. | 356/368 |
| 4,584,476 A | 4/1986 | Colombotto et al. | 250/338.1 |
| 4,909,630 A | 3/1990 | Gawrisch et al. | 356/364 |
| 5,026,160 A | 6/1991 | Dorain et al. | 356/326 |
| 5,191,392 A | 3/1993 | Johnson | 356/353 |
| 5,450,205 A * | 9/1995 | Sawin et al. | 356/632 |
| 5,544,268 A | 8/1996 | Bischel et al. | 385/4 |
| 5,647,036 A | 7/1997 | Deacon et al. | 385/27 |
| 5,664,032 A | 9/1997 | Bischel et al. | |
| 5,835,458 A | 11/1998 | Bischel et al. | 369/44.12 |
| 5,871,805 A * | 2/1999 | Lemelson | 427/8 |
| 5,911,018 A | 6/1999 | Bischel et al. | 385/16 |
| 5,912,997 A | 6/1999 | Bischel et al. | 385/15 |
| 5,929,993 A | 7/1999 | Johs | 356/364 |
| 5,936,734 A | 8/1999 | Johs et al. | 356/364 |
| 5,978,524 A | 11/1999 | Bischel et al. | 385/4 |
| 6,078,704 A | 6/2000 | Bischel et al. | 385/4 |
| 6,088,096 A | 7/2000 | Aoki et al. | 356/316 |
| 6,118,908 A | 9/2000 | Bischel et al. | 385/14 |
| 6,141,465 A | 10/2000 | Bischel et al. | 385/4 |
| 6,167,169 A | 12/2000 | Brinkman et al. | 385/4 |
| 6,181,418 B1 | 1/2001 | Palumbo et al. | 356/328 |
| 6,278,809 B1 * | 8/2001 | Johnson et al. | 385/12 |
| 6,303,518 B1 | 10/2001 | Tian et al. | 438/758 |
| 6,381,008 B1 | 4/2002 | Branagh et al. | 356/72 |
| 6,522,794 B1 | 2/2003 | Bischel et al. | 385/4 |

(Continued)

OTHER PUBLICATIONS

Thong, Tran et al. "Lomb-Wech Periodogram for Non-uniform Sampling". Proceedings of the 26th Annual International Conference of the IEEE EMBS, Sep. 1-5, 2004, pp. 271-274.*

(Continued)

*Primary Examiner*—Michael A Lyons
(74) *Attorney, Agent, or Firm*—James D. Welch (57) ABSTRACT

A method of monitoring, in real time, the depth to which a process sample is etched by an etching procedure involving investigating a sample substrate that has a patterned surface which, when electromagnetic radiation in an appropriate wavelength range is caused to reflect from, demonstrates lateral interference effects, such that when a frequency transform is applied to spectroscopic reflection data, three distinguishable peaks occur, at least for some range of pattern depth in the sample surface.

12 Claims, 7 Drawing Sheets

U.S. PATENT DOCUMENTS

| | | | |
|---|---|---|---|
| 6,541,400 B1 | 4/2003 | Tian et al. | 438/784 |
| 6,611,636 B2 | 8/2003 | Deliwala | 385/14 |
| 6,633,076 B2 | 10/2003 | Krishnaraj et al. | 257/641 |
| 6,636,309 B1 * | 10/2003 | Johs et al. | 356/369 |
| 6,671,443 B2 | 12/2003 | Deliwala | 385/125 |
| 6,823,112 B2 | 11/2004 | Deliwala | 385/37 |
| 6,826,320 B2 | 11/2004 | Deliwala | 385/14 |
| 6,869,881 B2 | 3/2005 | Deliwala | 438/689 |
| 6,891,685 B2 | 5/2005 | Deliwala et al. | 359/831 |
| 6,895,136 B2 | 5/2005 | Deliwala | 385/14 |
| 6,940,595 B1 * | 9/2005 | Johs et al. | 356/369 |
| 7,193,709 B1 * | 3/2007 | Johs et al. | 356/369 |
| 7,268,876 B1 * | 9/2007 | Johs | 356/369 |
| 7,283,234 B1 * | 10/2007 | Woollam et al. | 356/369 |
| 7,385,697 B2 * | 6/2008 | Woollam et al. | 356/369 |
| 2003/0133126 A1 * | 7/2003 | Sarfaty et al. | 356/503 |
| 2004/0246493 A1 * | 12/2004 | Kim et al. | 356/504 |
| 2006/0082786 A1 * | 4/2006 | Kim et al. | 356/504 |

OTHER PUBLICATIONS

"Optical Etch-Rate Monitoring Using Active Device Areas: Lateral Interference Effects", by Heimann, J. Electrochem. Soc., vol. 132, No. 8, (1985), (note, this paper defines the terminology "lateral interference" as used herein).

"Ultraviolet-Visible Ellipsometry For Process Control During The Etching of Submicron Features", by Blayo et al., J. Op. Soc. Am., vol. 12, No. 3, (1995).

"Multiwavelength Ellipsometry For Real-Time Process Control of The Plasma Etching of Patterned Samples", Maynard et al., J. Vac. Sci. Technol. B 15(1) (1997).

Plasma Etching of Submicron Devices: In Situ Monitoring and Control by Multi-Wavelength Ellipsometry; Thin Solid Films, Maynard et al., 313-314, (1998).

"Thin-Film Interferometry of Patterned Surfaces"; Maynard et al., J. Vac. Technol. B, vol. 13, No. 3, (May/Jun. 1995).

"Optical Etch Rate Monitoring: Computer Simulation of Reflectance", Heimann et al., J. Electrochem. Soc., vol. 131, No. 4, (1994).

* cited by examiner

METHOD OF DETERMINING SUBSTRATE ETCH DEPTH

This Application Claims Benefit of Provisional Application Ser. No. 60/637,388, Filed Dec. 20, 2004.

TECHNICAL FIELD

The disclosed invention relates to methodology for monitoring the etching of sample surfaces which demonstrate lateral interference effects when electromagnetic radiation is caused to reflect therefrom, and more particularly to a method of monitoring, in real time, the depth to which a sample substrate is etched by an etching procedure.

BACKGROUND

It is known to etch patterns in process substrates using, for instance, plasmas. Typically a pattern is delineated on a process substrate surface by a photoresist procedure. It can be difficult, however, to monitor the depth to which a process substrate is etched in real time.

For instance, as described in a Patent to Branagh et al., U.S. Pat. No. 6,381,008, the etching of silicon dioxide can be accomplished in an etching chamber which contains fluorine or chlorine in the presence of a plasma. A reduced pressure, (eg. $10^{-5}$ Torr), ambient into which is introduced $CF_4$, or more commonly, $C_2F_6$ or $C_4F_8$, gas is often utilized in industrial settings. While silicon dioxide is being etched in such a setting, certain etch products are formed, and if a beam of electromagnetic radiation is caused to pass through them, said products relatively strongly absorb energy at specific wavelengths, while energy present at other wavelengths is less strongly affected. Alternatively, energy provided by a present plasma serves to excite etch products and emissive electromagnetic radiation therefrom can be monitored. Careful monitoring of such intensity vs. wavelength spectra as a function of time can provide insight as to when silicon dioxide available for etching has been etched away, and when underlying silicon is reached. For instance, upon reaching silicon, the products of etching silicon dioxide are greatly reduced, (some small amount of said silicon dioxide etch products can still be produced as a result of typically undesirable over-etching laterally under photoresist defined boundaries, however). And it is possible that new products due to interaction of plasma and etching gas with silicon will appear and affect monitored intensity vs. wavelength spectra. This is particularly true where some oxygen is present and the underlying silicon is etched. However, the products of said interaction of plasma and etching gas with silicon, it is to be understood, typically demonstrate very different electromagnetic spectrum absorbence and/or emission characteristics. It is to be understood that the procedure comprising detection of products of an etch procedure as an indication of etch end point, can be practiced where other than silicon dioxide is etched, (eg. Al, SiN and W).

Said Patent to Branagh et al., U.S. Pat. No. 6,381,008 describes a method of identifying semiconductor etch end points comprising:

A. providing a semiconductor etch end-point detecting system comprising a spectrometer system which sequentially comprises, as encountered by entered electromagnetic radiation:
    a. at least one means for receiving electromagnetic radiation;
    b. a first reflecting means with a focal length less than two-hundred-fifty (250) millimeters;
    c. at least one diffracting means;
    d. a second reflecting means with a focal length less than two-hundred-fifty (250) millimeters; and
    e. at least one detector means consisting of centrally located active detectors and laterally disposed packaging;

said diffracting means being mounted on a stage which is positioned physically between said detector means on one side thereof, and said first and second reflecting means on a second side thereof; such that, in use, electromagnetic radiation is caused to enter said means for receiving electromagnetic radiation and reflect from said first reflecting means, then interact with said diffracting means such that a diffracted spectrum of electromagnetic radiation is caused to reflect from said second reflecting means and enter said detector, means, in which spectrometer system the first reflecting means has a focal length which is less than that of said second reflecting means and in which spectrometer system at least part of the detector means laterally disposed packaging is positioned behind said diffracting means in the sense that electromagnetic radiation reflecting from said second reflecting means is blocked direct access thereto by said diffracting means;

said semiconductor etch end-point detecting system further including, in function combination with said spectrometer system, a means for effecting plasma etching of semiconductor comprising:
    a. at least one vacuum chamber in which a semiconductor system to be etched is present during use;
    b. at least one means for entering etching gas to said vacuum chamber;
    c. at least one means for applying electrical energy to said etching gas;
    d. at least one means for accessing electromagnetic radiation present in said vacuum chamber during a semiconductor etching process; and
    e. at least one means for guiding said accessed electromagnetic radiation into said spectrometer system means for receiving a electromagnetic radiation;

said method of identifying semiconductor etch end points further comprising chronologically repeatedly performing steps B. through F. in an evolving windowed factor analysis sequence until detecting semiconductor etch end point; said steps B. through F. being:

B. during a semiconductor etch procedure in said vacuum chamber, obtaining a chronological sequence of electromagnetic radiation intensity vs. wavelength spectra from said spectrometer system detector means, said spectrometer system detector means being caused to access electromagnetic radiation present in said vacuum chamber during a semiconductor etching process;

C. selecting some number of electromagnetic radiation intensity vs. wavelength spectra from said chronological sequence of electromagnetic radiation intensity vs. wavelength spectra and forming them into a data matrix;

D. optionally selecting and deleting some set-off number of rows (columns) in said data matrix;

E. by applying mathematical matrix decomposition techniques to said data matrix determining value(s) of at least one representative parameter(s), each said representative parameter(s) being selected from the group consisting of: (members of a diagonal matrix and eigenvalues);

F. detecting semiconductor etch end point based upon change in said repeatedly calculated at least one representative parameter value(s) resulting from said chronologically repeated performance of steps B. through F.

A recent paper which describes the use of low pressure high density plasma etching of silicon dioxide is titled "Chemical Challenge of Submicron Oxide Etching", by McNevin et al., J. Vac. Technol. B 15(2) (March/April 1997).

References cited in the Branagh et al. Patent are:
U.S. Pat. No. 5,026,160 to Dorain et al.;
U.S. Pat. No. 5,991,023 to Morawski et al.;
U.S. Pat. No. 6,088,096 to Aoki et al.;
U.S. Pat. No. 6,181,418 to Palumbo et al.;

and Articles cited therein are:
"An Integrated System of Optical Sensors For Plasma Monitoring And Plasma Control", Anderson & Splichal, SPIE Vo. 2091, (1994). Real-time plasma etching utilizing sensors which measure plasma properties directly related to desired wafer features are discussed.
"Application of Chemometrics to Optical Emission Spectroscopy For Plasma Monitoring", Splichal & Anderson, SPUE Vol. 1595, (1992) is also identified as monitoring of real-time plasma etching processes, based upon sensors which measure plasma properties that relate directly to desired etch features, is discussed.
"Sensor Systems For Real-time Feedback Control Of Reactive Ion Etching", Benson et al. J. Vac. Sci. Technol. B 14(1), (January/February 1996), is identified as it describes use of an optical emission spectroscopy system sensor utilized in multivariant feedback control of plasma etching of wafers.
"Etching—.35 m Polysilicon Gates On A High-Density Helicon Etcher", Kroft et al., J. Vac. Sci. Technol. B 14(1) (January/February 1996), is disclosed as it describes an example of application plasmas in selective polysilicon-to-oxide plasma etching procedures.
"In Situ Diode Laser Absorbtion Measurements Of Plasma Species In A Gaseous Electronics Conference Reference Cell Reactor", Oh, Stanton, Anderson & Splichal, J. Vac. Sci. Technol B 13(3) (May/June 1995). is identified as it discusses monitoring of electromagnetic absorption during etching procedures.
"Optical Emission Spectroscopy of $H_2$—CO and $H_2O$—$CH_3OH$ Plasmas For Diamond Growth", Manukonda & Dillon, J. Vac. Sci. Technol. A 13(3) (May/June 1995), is identified as it describes monitoring of electromagnetic emissions during a procedure in which diamond was grown.
"End Point Control Via Optical Emission Spectroscopy", Litvak, J. Vac. Sci. Technol. B 14(1) (January/February 1996) describes the use of optical emission spectroscopy in identifying oxide etch end points, utilizing a conventional monochromator/photomultiplier system in conjunction with an end-point detecting algorithm.

Many additional papers which describe plasma etching in the semiconductor fabrication area exist.

Known papers which utilize Reflected Electromagnetic Radiation Intensity and Ellipsometry to investigate Etching of semiconductor systems are:
"Optical Etch-Rate Monitoring Using Active Device Areas: Lateral Interference Effects", by Heimann, J. Electrochem. Soc., Vol. 132, No. 8, (1985), (note, this paper defines the terminology "lateral interference" as used herein);
"Ultraviolet-Visible Ellipsometry For Process Control During The Etching Of Submicron Features", by Blayo et al., J. Op. Soc. Am., Vol. 12, No. 3, (1995);
"Multiwavelength Ellipsometry For Real-Time Process Control Of The Plasma Etching Of Patterned Samples", Maynard et al., J. Vac. Sci. Technol. B 15(1) (1997);
"Thin Film Interferometry of Patterned Films"; Maynard et al., J. Vac. Sci., Technol. B, Vol. 13, (May/June 1995);
"Spectral Ellipsometry on Patterned Wafers", Duncan, SPIE, Vol. 2637, (April 1995);
"Optical Analysis of Complex Multilayer Structures . . . " Johs et al.; SPIE, Vol. 2253, (1994);
"Sample Depolarization Effects From Thin Films of ZnS . . . "; Appl. Phys. Lett. 61(5), August (1994);
"Optical Etch Rate Monitoring: Computer Simulation Of Reflectance", Heimann et al., J. Electrochem. Soc., Vol 131, No. 4, (1984).

Known Patents are:
U.S. Pat. No. 5,929,993 to Johs, is disclosed as it describes application of Fourier Transforms in the determination of total film retardence in birefringent films.

Patents identified in said 993 Patent are:
Patent to Krieger et al., U.S. Pat. No. 3,274,882;
Patent to Simila, U.S. Pat. No. 3,807,868;
Patent to. Gorman et al., U.S. Pat. No. 4,523,848;
Patent to Colombotto et al., U.S. Pat. No. 4,584,476;
Patent to Gawrisch et al., U.S. Pat. No. 4,909,630;
Patent to Johnson, U.S. Pat. No. 5,191,392.
Patent to Johs et al., U.S. Pat. No. 5,936,735 is disclosed as it describes an approach to analyzing data obtained by monitoring both coherent and incoherent addition of beam components which result from interaction with a patterned substrate.

Patents identified in the 735 Patent are:
Patent to Woollam et al., U.S. Pat. No. 5,373,359;
Patent to Ducharme et al., U.S. Pat. No. 5,426,588;
Patent to Johs et al., U.S. Pat. No. 5,504,582; and
Patent to Green et al. U.S. Pat. No. 5,521,706.

Another Patent, by Blayo et al. is U.S. Pat. No. 5,494,697.

A Search of Patents using key words "Substrate Etch" and "Fourier Transform provided:
U.S. Pat. No. 6,895,136 to Deliwala;
U.S. Pat. No. 6,891,685 to Deliwala et al.;
U.S. Pat. No. 6,869,881 to Deliwala;
U.S. Pat. No. 6,826,320 to Deliwala;
U.S. Pat. No. 6,823,112 to Deliwala;
U.S. Pat. No. 6,671,443 to Deliwala;
U.S. Pat. No. 6,633,076 to Krishnaraj et al.;
U.S. Pat. No. 6,611,636 to Deliwala;
U.S. Pat. No. 6,541,400 to Tian et al.;
U.S. Pat. No. 6,522,794 to Bischel et al.
U.S. Pat. No. 6,303,518 to Tian et al.;
U.S. Pat. No. 6,167,169 to Brinkman et al.;
U.S. Pat. No. 6,141,465 to Bischel et al.;
U.S. Pat. No. 6,118,908 to Bischel et al.;
U.S. Pat. No. 6,078,704 to Bischel et al.;
U.S. Pat. No. 5,978,524 to Bischel et al.;
U.S. Pat. No. 5,912,997 to Bischel et al.;
U.S. Pat. No. 5,911,018 to Bischel et al.;
U.S. Pat. No. 5,835,458 to Bischel Pet al.;
U.S. Pat. No. 5,724,463 to Deacon et al.;
U.S. Pat. No. 5,664,032 to Bischel et al.;
U.S. Pat. No. 5,647,036 to Deacon et al.;
U.S. Pat. No. 5,544,268 to Bischel et al.

Also disclosed is a book titled "Numerical Recipes in C", Cambridge Press, Press et al. Said book provides insight to application of Fourier and Lomb Transforms.

Need exists for improved, simple to practice methodology for accurately tracking the results of a process substrate etching procedure in real time.

DISCLOSURE OF THE INVENTION

The present invention can be applied to any sample that has a patterned surface which, when electromagnetic radiation in an appropriate wavelength range is caused to reflect from, demonstrates lateral interference effects such that when a frequency transform is applied to spectroscopic reflection data three distinguishable peaks occur, at least for some range of pattern depth in the sample surface. It is noted that for some pattern depths in a sample surface, peaks in the frequency transform data can occur at the same frequency, but as the depth changes said peaks become distinguishable. The present invention is therefore particularly applicable to dynamic monitoring of samples in which the surface pattern is being etched deeper into the surface over time.

The present invention then is primarily a method of determining etch depth of a pattern in the surface of a sample. The procedure begins with placing a process sample, and optionally a witness sample, into a chamber for performing etching. The process sample, and/or witness sample, comprises a surface with a patterned layer present thereupon comprised of a material other than the substrate material which is common to both said process sample and and witness sample. The substrate material is directly accessible where the material of the patterned layer is removed to form said pattern. The procedure continues by causing a beam of electromagnetic radiation to reflect from said process sample or witness sample while etching of said substrate material is being performed, such that a plot of reflectance vs. photon energy, (or the equivalent in wave number of energy etc.,) is effectively produced. Said plot demonstrates the effects of lateral interference between electromagnetic radiation rays which reflect from the surface of the patterned layer and from the substrate material.

The next step involves performing a frequency domain transform of said reflection data with the result being that at least two identifiable peaks result, one thereof being proportional to the optical depth of the material of the patterned layer and the other being proportional to the optical depth of the air in the region of the patterned layer which is removed to provide access to said substrate material. The frequency domain transform data is utilized in mathematical calculations which quantify the depth of the substrate material etching.

The step of performing a frequency domain transform is typically preceded by determining an average value of said data and subtracting said average value such that the data oscillates substantially about "0.0".

Said method can involve a process sample and a witness sample both made of any etchable material, and the patterned layer can be photoresist, or any other material. The pattern on the surface of the witness sample can be a plurality of 10 micron lines separated by 10 micron spaces. It is noted that this need not be the pattern on the process sample, and in fact, normally is not. However, if the pattern on the process sample approximates this pattern or another functional pattern, the process sample pe se. can be monitored directly and a witness sample is not required.

The frequency domain transform can be a Fourier transform, although a LOMB transform has been found to provide better results in some cases. For insight, a Fourier transform approach can be used where evenly spaced, in time, data points are available, but where evenly spaced data points are not available the Lomb approach, which utilizes unevenly spaced data points can be applied with benefit. While the Fourier transform approach can be applied to unevenly spaced, in time, data points by applying an interpolation to provide evenly spaced data points, said approach has not proven to be as good as applying the Lomb approach. This is because the Fourier approach weighs data on a per time interval basis, while the Lomb approach weighs data on a per data point basis. It is noted that sampling at uneven intervals can enter serious error into per time interval weighted data. It is emphasised, however, that the present invention is not limitied to practice using Fourier and Lomb transforms.

The disclosed invention will be better understood by reference to the Detailed Description Section of this Specification, in combination with the Drawings.

SUMMARY OF THE INVENTION

It is therefore a primary purpose and/or objective of the present invention to teach use of frequency transformed spectroscopic reflection data which is caused to reflect from a patterned sample while its substrate material is being etched, followed by mathematical analysis thereof to .quantify the depth of the etching of the sample substrate material.

It is another purpose and/or objective of the present invention to identify use of Fourier and Lomb transforms in practice of the method of the present invention.

Other purposes and/or objectives will be apparent from a reading of the Specification and Claims.

BRIEF DESCRIPTION OF THE DRAWINGS

FIG. 2b shows first (P1) and second (P2) and third (P3) peaks of a frequency transform plot of the data in FIG. 2a.

FIGS. 3a and 3b are provided which are analogically similar to FIGS. 2a and 2b. However, there is no patterning present in a layer of non-substrate material atop a substrate.

FIG. 3b shows there is only one frequency domain peak present in the frequency transform of the data in FIG. 3a.

DETAILED DESCRIPTION

Figure 1A:
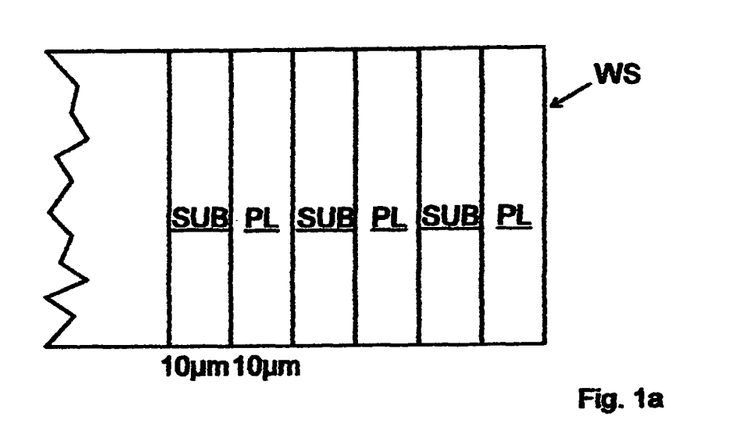
FIGS. 1a 1b and 1c, there are shown a Top and a Side view of a Sample (WS).
Figure 1B:
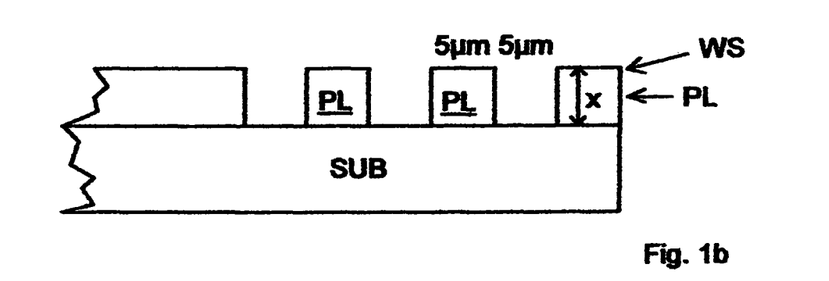
Figure 1C:
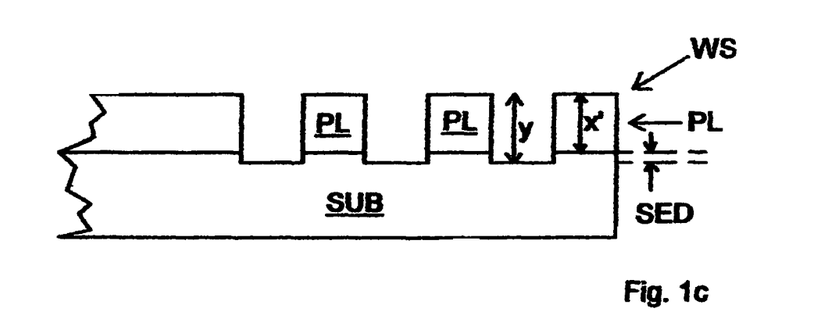

Turning now to FIGS. 1a and 1b, there are shown a top and a side view of a sample (WS). Note that the patterned layer (PL) is typically photoresist of an initial depth (X). FIG. 1c shows the sample (WS) after an etching process so that the patterned layer depth (X) is reduced to (X'), and so that the substrate is etched to a substrate etch depth (SED).

Figure 2A:
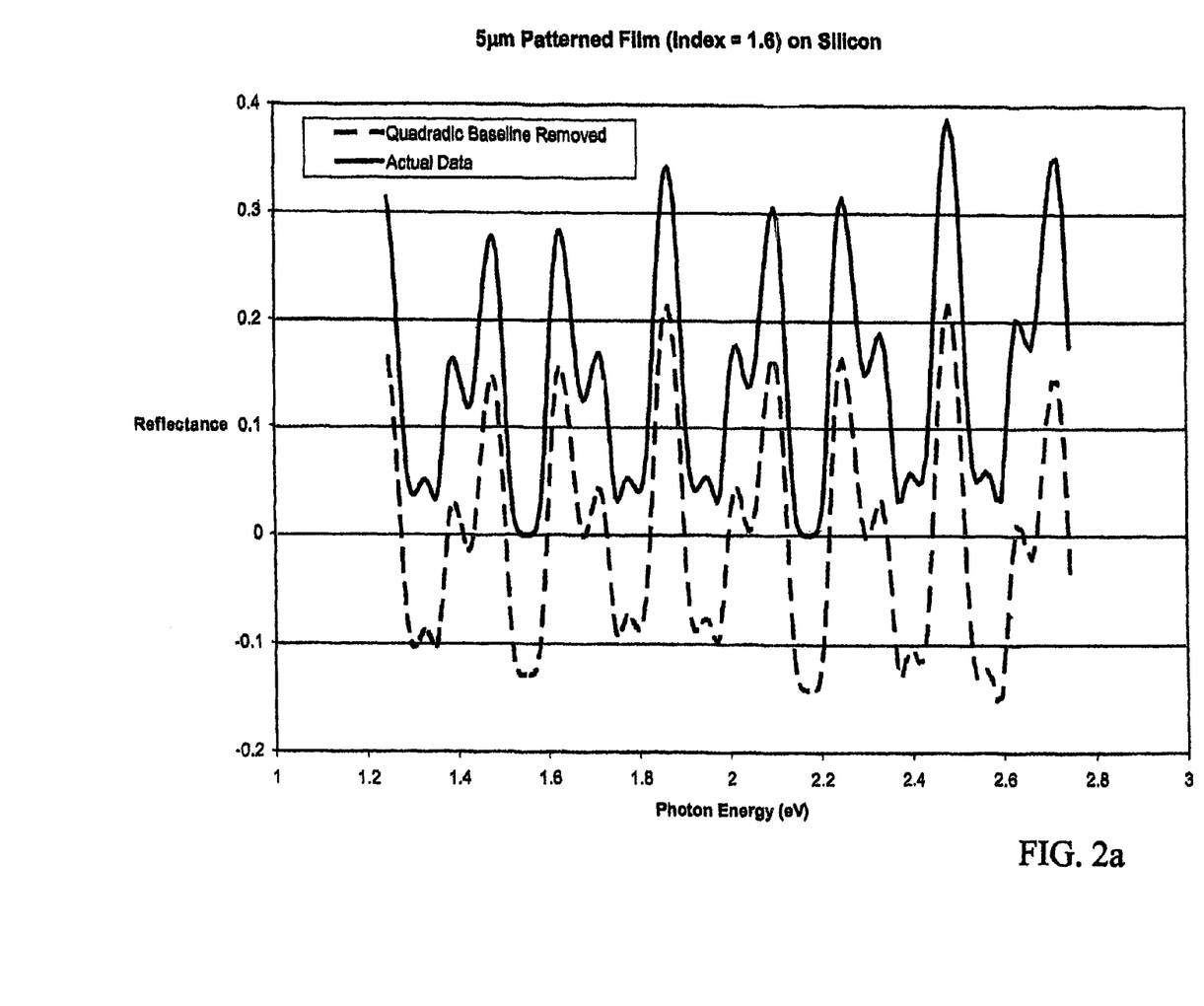
FIG. 2a shows Reflectance data obtained by causing electromagnetic radiation to impinge on and reflect from said Sample at a Normal Angle-of-Incidence (AOI).

FIG. 2a shows Reflectance data obtained by causing electromagnetic radiation to impinge on and reflect from said sample (WS) at a normal angle-of-incidence (AOI). (Note, ellipsometric data and/or an oblique (AOI) can also be used). Note the solid lines show the presence of interference oscillations around an "average value". The dashed lines show said date with the "average value" subtracted away so that the interference oscillations are about "0.0". FIG. 3 shows a frequency domain representation of the data in FIG. 2a. Note the presence of three (3) peaks. The first peak (P1) provides information about the patterned layer (PL) depth (X'), and second peak (P2) provides information about the depth of the void (Y), (see FIG. 1c). As etching takes place the relative positioning of said first (P1) and second (P2) peaks changes, with said change providing information about the substrate etch depth (SED), (again see FIG. 1c). Note that the substrate etch depth (SED) shown in FIG. 2c for a witness sample, will be substantially the same as an etch depth of a process sample located close thereto during the etching process.

It is also noted that the third peak (P3) is found to be present at 1/energy, (alternatively stated as the wavelength or wave number etc.), which is the difference between the locations of the first (P1) and second (P2) peaks. For example, in FIG. 2b the third peak (P3) is at "5" and the difference between the locations of the first (P1) and second (P2) peaks is also "5".

Figure 2B:
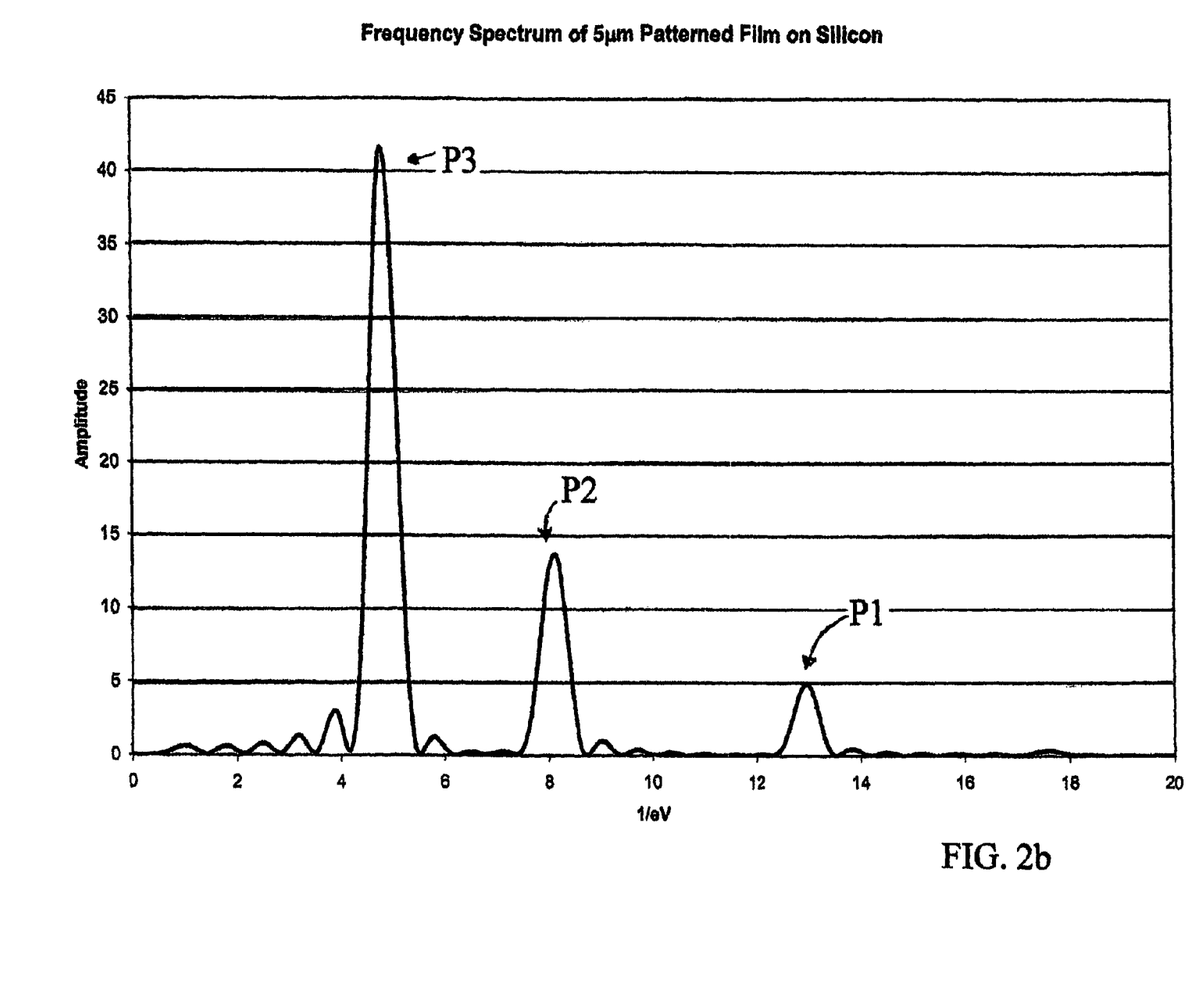
Figure 2C:
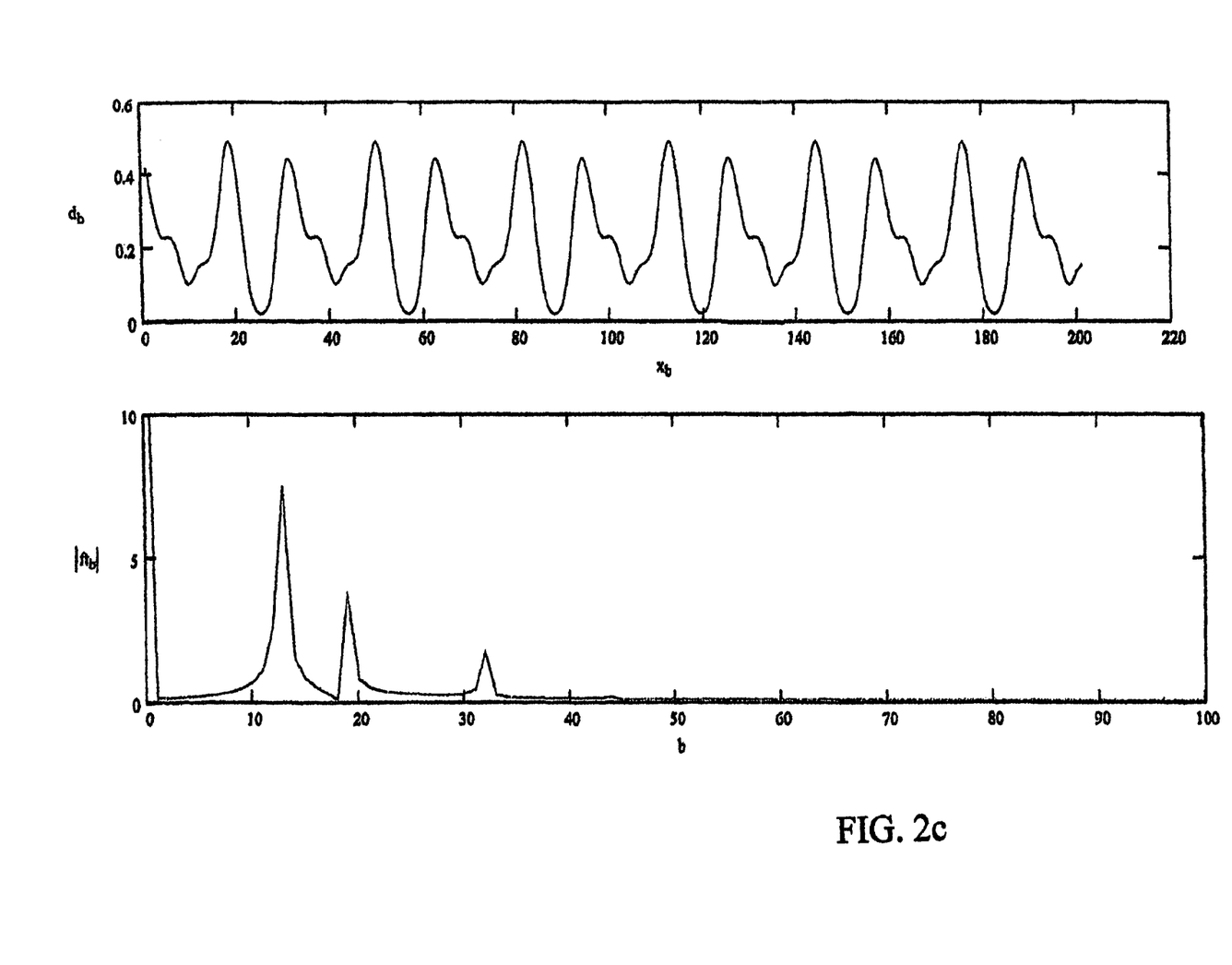
FIG. 2c is included as an additional example of the same effect as described for FIGS. 2a and 2b.

FIG. 2c is included as an additional example of the same effect as described for FIGS. 2a and 2b. Note that step of removing an average value in the time domain data is not present.

Figure 3A:
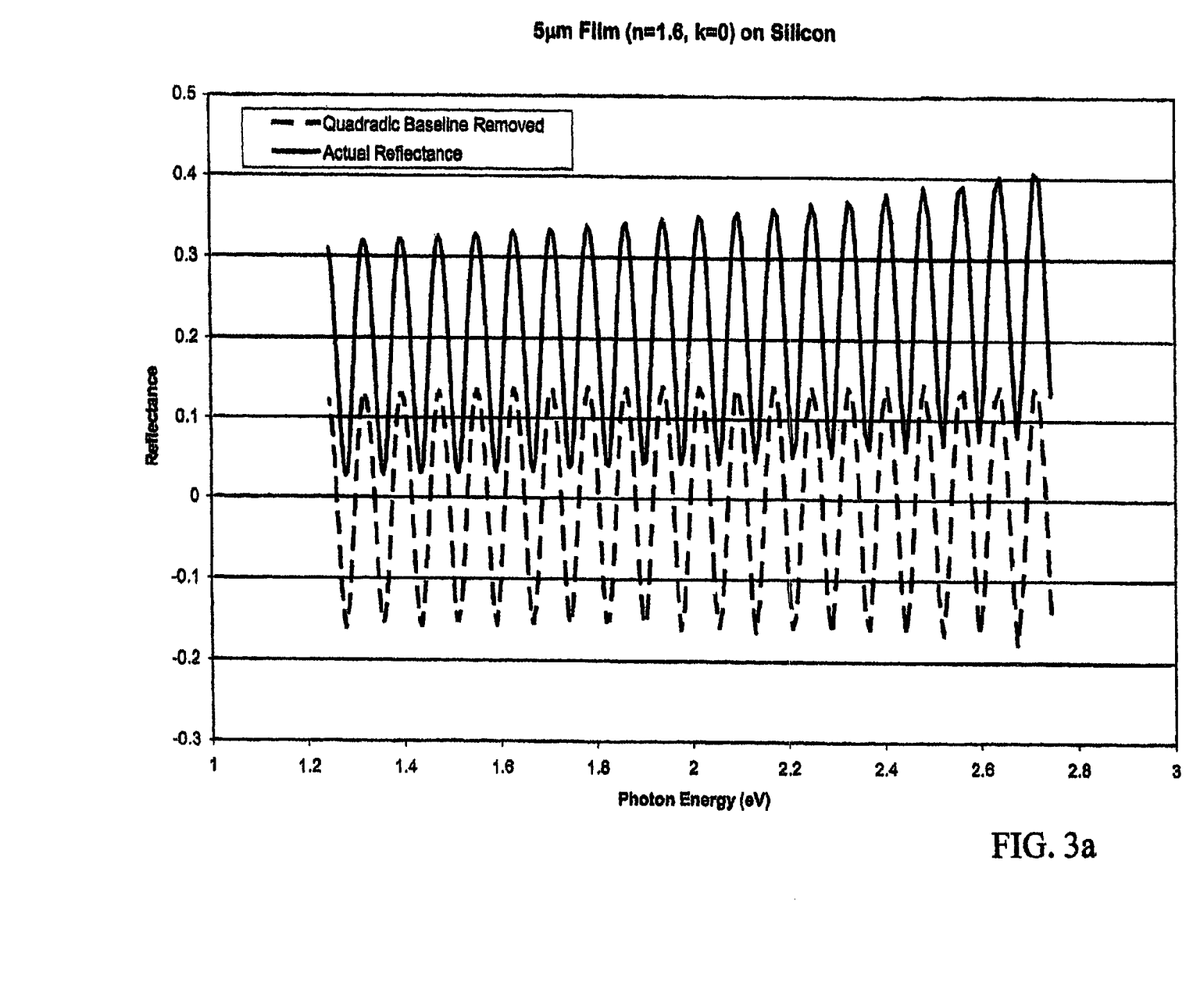
Figure 3B:
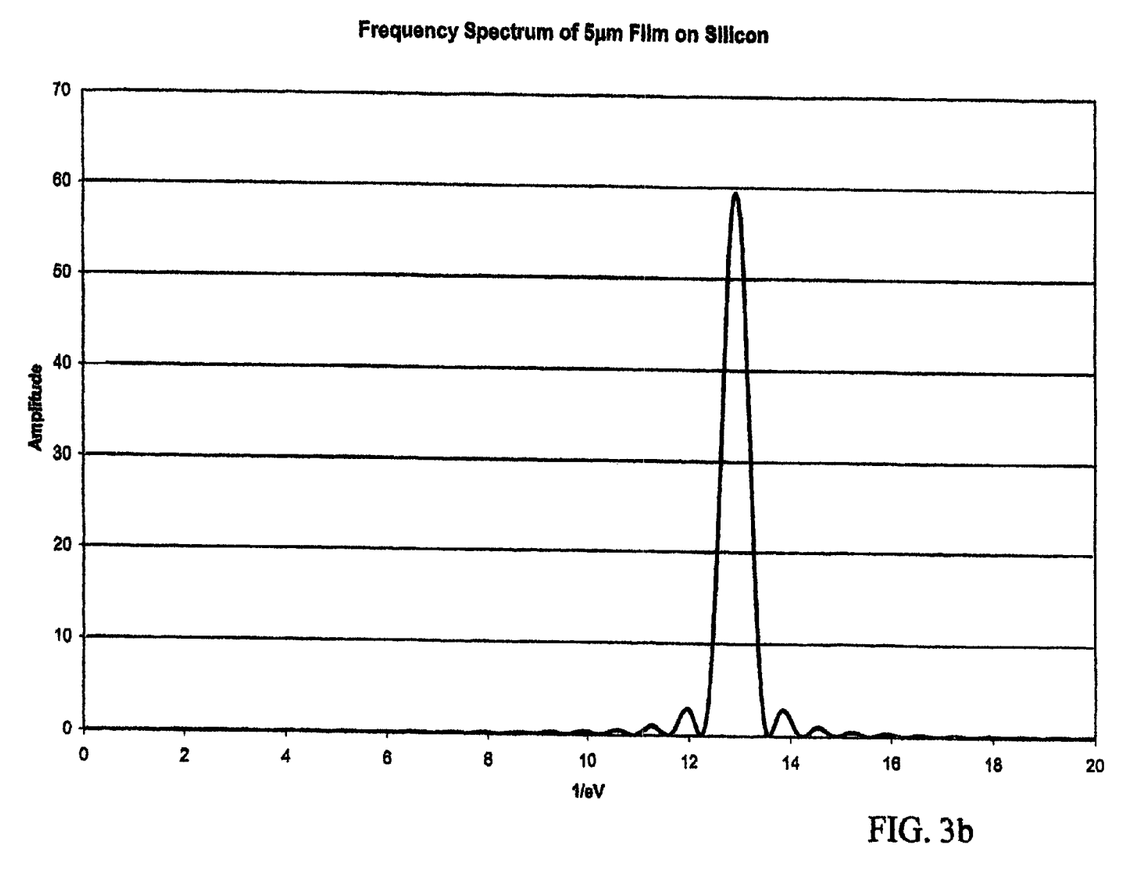

For comparison, FIGS. 3a and 3b are provided which are analogically similar to FIGS. 2a and 2b. However, there is no patterning present in a layer of non-substrate material atop a substrate. Note that only one frequency domain peak is present in FIG. 3b. For some wavelength and etch depth conditions a similar result can appear, but during dynamic etching such a condition will not persist where lateral inferference occurs.

It is also noted that while visible wavelengths and 10 micron spacing on the witness sample pattern were used in the work reported herein, any functional combination of wavelength and pattern spacing is within the scope of the present invention.

While a fourier transform, which is applied to data points equally spaced in time, can be applied to arrive at the frequency domain plots, (FIGS. 2b and 3b), and a LOMB transform can be applied to data points which are not evenly spaced in time, it is to be understood that any functional frequency transform can be utilized.

It is to be understood that a sample (WS) comprises a patterned layer of a material such as photoresist on surface of sample substrate material. A witness sample is made of the same substrate material as a process sample (PS), but has a different patterned layer design on a surface thereof which is more suitable to providing data affected by the ocurance of lateral interference, so that the frequency transform data demonstrates a plurality of frequency domain peaks.

It is noted that the sample (WS) is typicaly a witness sample which is desiged to with a pattern on its surface of appropriate dimensions to provide good data, however, where a process sample (PS) has a suitable pattern on its surface, it can be directly monitored.

Figure 4:
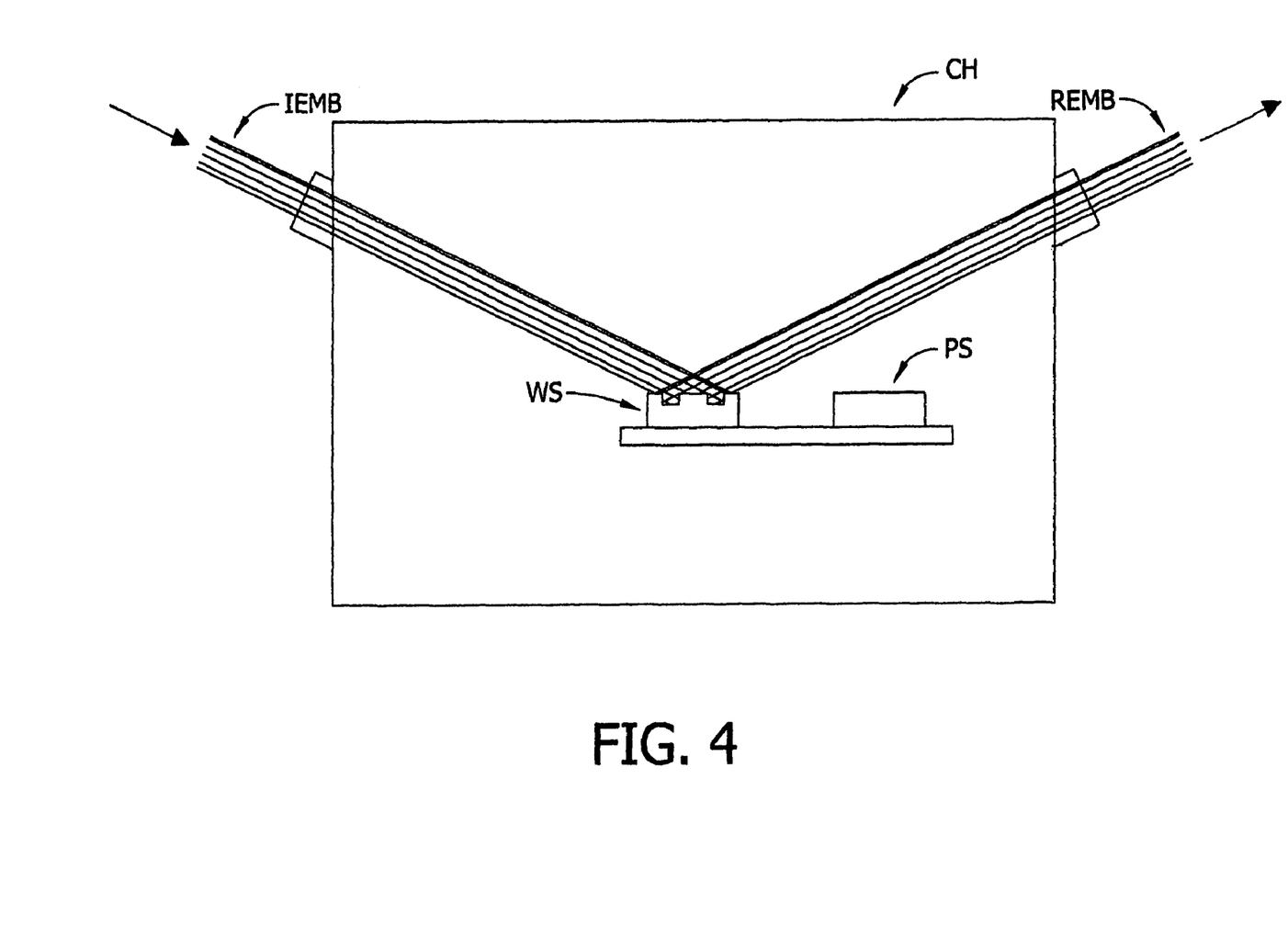
FIG. 4 is included to show a witness sample (WS) and process sample (PS) in a chamber (CH) for performing sample etching.

Finally, FIG. 4 is included to show a witness sample (WS) and process sample (PS) in a chamber (CH) for performing sample etching. Also shown is a beam of electromagnetic radiation (IEMB) impinging on and reflecting from a witness sample (WS) AS reflected electromagnetic beam (REMB), and progressing toward means that produce a plot of reflectance or an ellipsometric parameter vs. photon energy or wavelength or wavenumber or mathematical equivalent such as demonstrated in FIG. 2a. Any means for causing sample etching (SED) as demonstrated by the change between FIG. 1b and FIG. 1c, can be applied inside the chamber (CH).

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

The invention claimed is:

1. A method of determining etch depth in a process sample made of a sample material, comprising the steps of:
    a) placing a process sample and a witness sample into a chamber for performing sample etching, said witness sample comprising a surface with a patterned layer present thereupon of a material different from the sample material which is common to both said process sample and witness sample, said witness sample material being directly accessible where the material of the patterned layer is removed to form said pattern;
    b) causing a beam of electromagnetic radiation to reflect from said witness sample while etching of said process sample and witness sample is being performed, such that a plot of reflectance or an ellipsometric parameter vs. photon energy or wavelength or wavenumber or mathematical equivalent is effectively produced, said plot demonstrating interference between electromagnetic radiation rays which reflect from the surface of the patterned layer and from the witness sample material;
    c) performing a frequency domain transform of said plot obtained in step b with the result of said frequency domain transform being that at least three identifiable frequency domain peaks result, one of said peaks being proportional to the depth of the patterned layer material, the second of said peaks being proportional to the depth of the atmosphere in the region of the patterned layer which is removed to provide access to said witness sample material including the witness sample etch depth, and the third peak being located at a position determined by the difference between the positions of the first and second peaks along the photon energy or wavelength or wavenumber or mathematical equivalent axis;
    d) using said frequency domain transform plot to perform a mathematical calculation which quantifies etching of the witness sample material; and
    e) accepting the results obtained in step d only if said third peak is present at the appropriate position.

2. A method as in claim 1 in which the step of performing a frequency domain transform is preceded by determining an average value of said plot and subtracting said average value from the plot such that the plot oscillates substantially about 0.0.

3. A method as in claim 1, in which the material of the patterned layer present upon said witness sample is photoresist.

4. A method as in claim 1 in which the pattern in the patterned material on the surface of the witness sample is a plurality of 10 micron lines separated by 10 micron spaces.

5. A method as in claim 1 in which the frequency domain transform is a LOMB transform.

6. A method as in claim 1 in which the frequency domain transform is a Fourier transform.

7. A method of determining etch depth in a process sample made of a sample material, comprising the steps of:
    a) placing a process sample into a chamber for performing sample etching, said process sample comprising a surface with a patterned layer present thereupon of a material different from the sample material, said process sample material being directly accessible where the material of the patterned layer is removed to form said pattern;

b) causing a beam of electromagnetic radiation to reflect from said process sample while etching thereof is being performed, such that a plot of reflectance or an ellipsometric parameter vs. photon energy or wavelength or wavenumber or mathematical equivalent is effectively produced, said plot demonstrating interference between electromagnetic radiation rays which reflect from the surface of the patterned layer and from the process sample material;

c) performing a frequency domain transform of said plot obtained in step b with the result of said frequency domain transform being that at least three identifiable frequency domain peaks result, one of said peaks being proportional to the depth of the patterned layer material, the second of said peaks being proportional to the depth of the atmosphere in the region of the patterned layer which is removed to provide access to said process sample material including the process sample etch depth, and the third peak being located at a position determined by the difference between the positions of the first and second peaks along the photon energy or wavelength or wavenumber or mathematical equivalent axis;

d) using said frequency domain transform plot to perform a mathematical calculation which quantifies etching of the process sample material; and e) accepting the results obtained in step d only if said third peak is present at the appropriate position.

8. A method as in claim 7 in which the step of performing a frequency domain transform is preceded by determining an average value of said plot and subtracting said average value from the plot such that the plot oscillates substantially about 0.0.

9. A method as in claim 7, in which the material of the patterned layer present upon said process sample is photoresist.

10. A method as in claim 7 in which the pattern in the patterned material on the surface of the process sample is a plurality of 10 micron lines separated by 10 micron spaces.

11. A method as in claim 7 in which the frequency domain transform is a LOMB transform.

12. A method as in claim 7 in which the frequency domain transform is a Fourier transform.

\* \* \* \* \*